J. G. SUMMERS.
TIRE.
APPLICATION FILED AUG. 6, 1919.

1,337,289.

Patented Apr. 20, 1920.

Witness

Inventor
J. G. Summers
By C. A. Snow & Co.
Attorneys

UNITED STATES PATENT OFFICE.

JOHN GORDON SUMMERS, OF SAN DIEGO, CALIFORNIA.

TIRE.

1,337,289.  Specification of Letters Patent.  Patented Apr. 20, 1920.

Application filed August 6, 1919. Serial No. 315,714.

*To all whom it may concern:*

Be it known that I, JOHN GORDON SUMMERS, a citizen of the United States, residing at San Diego, in the county of San Diego and State of California, have invented a new and useful Tire, of which the following is a specification.

The present invention relates to tires for automobiles the principal object being to provide a tire possessing the usual resilient qualities and at the same time dispensing with the pneumatic tube conventionally used, thereby eliminating punctures and blowouts.

A further object of the invention is to provide a tire which includes the conventional outer tire shoe or casing which is held in extended position through the medium of resilient springs interposed between the rim of the wheel and the tire shoe.

Still another object of the invention is to provide a tire of this type wherein the tire shoe may be readily removed from the spring element.

Another general object of the invention is to provide a resilient tire of this type which is simple in construction, which consists of few parts, and which may be manufactured and sold at a minimum cost.

With the above and other general objects and advantages in mind, the invention consists of the combinations of elements, constructions and arrangements, formations and operations, and general assemblage, the details of which will be hereinafter enlarged upon and recited in the subjoined claims.

On the drawings:—

Figure 1:
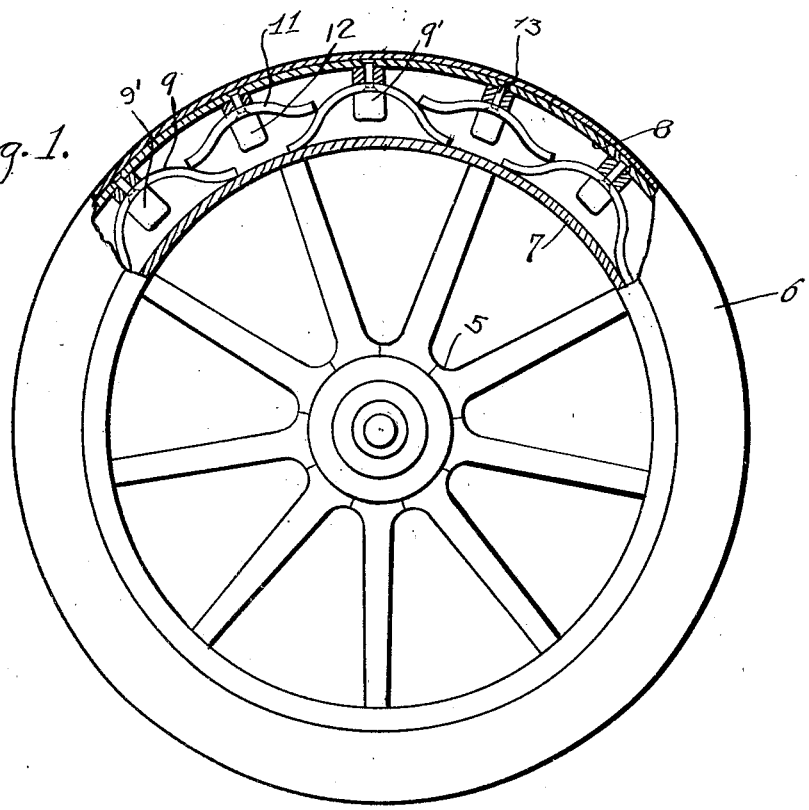
Figure 2:
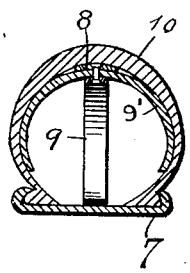

Figure 1 is a side view of my improved tire, parts being broken away in order to illustrate the position of the springs within the tire; and Fig. 2 is a transverse sectional view of the tire.

Referring in detail to the drawing wherein like characters of reference designate like parts on all of the views, the numeral 5 designates a vehicle wheel of usual construction while 6 indicates a tire shoe of usual construction which is engaged upon the rim 7 in the usual way.

Extending circumferentially within the tire and bearing against the crest of the same is a band 8.

A plurality of longitudinally bowed leaf springs 9 extend longitudinally of the tire within the same and have their ends resting upon the rim 7, the springs 9 being spaced apart and disposed so that the intermediate part or crest bears against leaf springs 9′ extending transversely between the band and the springs 9, said springs being secured to the band and retaining the same against the tire. The springs 9′ are secured to the springs 9 at the crests thereof said leaf springs 9′ being of the same configuration and contour as the tire in cross section and adapted to bear against the inner face of the tire outwardly of the band in order to retain the tire in extended position.

Extending longitudinally of the rim 7 and secured to the inner face of the band 8 upon either side of each of the springs 9 and bridging the space between the springs are longitudinally bowed leaf springs 11, the ends of which bear against the adjacent parts of the springs 9. Like the springs 9, the springs 11 have arcuate springs 12 secured thereto by fastenings 13, the springs 12 extending transversely of the tire and being disposed between the band 8 and the springs 11 in the same relation as the springs 9′ bear to the band 8 and the springs 9.

From the disclosure it will be manifest that the springs extend longitudinally and transversely of the tire and at all times retain the tire shoe in extended position so as to render the same resilient.

The embodiment of the invention here shown is considered the preferred construction, but it is to be understood that the same may be altered and changed in many ways and that my limits of such alterations are governed only by what is claimed.

What is claimed is:

1. In a tire, the combination with a rim, of a tire shoe mounted thereon, a plurality of leaf springs interposed between the rim and shoe and disposed in spaced relation and extending longitudinally of the tire, leaf springs bridging the spaces between the ends of the first-mentioned springs and bearing against the crest of the tire shoe, and leaf springs extending from both sets of leaf springs first-mentioned transversely of the tire and bearing against the inner face of the tire to retain the same in extended position.

2. The combination with a vehicle wheel rim, of a tire shoe mounted thereon, a band positioned within the shoe and extending circumferentially thereof and bearing against the crest of the same, longitudinally bowed leaf springs extending from the band and bearing against the rim, a second set of leaf springs extending longitudinally of the rim and extending from the band, the latter springs being disposed on opposite sides of the springs of the first set and adapted to bridge the spaces therebetween and having their ends engaged with the adjacent parts of said springs and transversely extended springs extending from the crest of both sets of the longitudinally extending springs of the same contour as the interior of the tire shoe and bearing against the inner face of the same.

3. In a tire, the combination with a rim; of a tire shoe mounted thereon, a plurality of leaf springs interposed between the rim and shoe and disposed in spaced relation circumferentially of the tire, said springs extending longitudinally of the tire, other leaf springs extending longitudinally of the tire, and bridging the spaces between the ends of the first-mentioned springs and bearing against the crest of the tire shoe, and leaf springs extending from both sets of longitudinal leaf springs between said springs and the tire shoe, said latter springs extending transversely of the tire and bearing against the inner face of the same to retain the tire shoe in its extended position.

4. A tire comprising a shoe, a filling element comprising an annular band adapted to fit circumferentially within the tire shoe at the crest thereof, a plurality of circumferentially spaced transversely positioned arcuate leaf springs secured to said band and having their ends terminating at the sides of the shoe, longitudinally extending bowed springs also secured to said band inwardly of the transverse springs and other longitudinal springs secured to alternate transverse springs and having connection with the band, with the ends thereof resting against the first-named longitudinal springs.

5. A tire including an annular band adapted to fit circumferentially within a tire shoe at the crest thereof, a plurality of equidistantly spaced transversely disposed leaf springs secured to said band and bearing against the sides of the shoe, a plurality of spaced longitudinally extending bowed springs secured to the band and having their inner ends disposed in contact with the rim of a wheel and other longitudinally bowed springs secured to the band and designed to contact with the sides of the first-named longitudinal springs inwardly of the free extremities thereof.

In testimony that I claim the foregoing as my own, I have hereto affixed my signature in the presence of two witnesses.

JOHN GORDON SUMMERS.

Witnesses:
REUBEN E. SUMMERS,
GEO. W. BOWLER.